United States Patent
Gong et al.

(10) Patent No.: US 12,176,759 B2
(45) Date of Patent: Dec. 24, 2024

(54) ROTOR ASSEMBLY AND MOTOR HAVING SAME

(71) Applicant: GUANGDONG ZHAOQING L&V CO. LTD., Guangdong (CN)

(72) Inventors: Hongyu Gong, Guangdong (CN); Li Tian, Guangdong (CN); Xiangxiong Cao, Guangdong (CN); Mingjie Zhao, Guangdong (CN)

(73) Assignee: GUANGDONG ZHAOQING L&V CO. LTD., Guangdong (CN)

( * ) Notice: Subject to any disclaimer, the term of this patent is extended or adjusted under 35 U.S.C. 154(b) by 0 days.

(21) Appl. No.: 17/632,962

(22) PCT Filed: Jul. 7, 2020

(86) PCT No.: PCT/CN2020/100612
§ 371 (c)(1),
(2) Date: Feb. 4, 2022

(87) PCT Pub. No.: WO2021/022959
PCT Pub. Date: Feb. 11, 2021

(65) Prior Publication Data
US 2022/0337105 A1    Oct. 20, 2022

(30) Foreign Application Priority Data

Aug. 5, 2019  (CN) .......................... 201910716524.3

(51) Int. Cl.
*H02K 1/28* (2006.01)
*H02K 1/24* (2006.01)
(52) U.S. Cl.
CPC ...................................... *H02K 1/24* (2013.01)
(58) Field of Classification Search
CPC ............ H02K 1/24; H02K 23/38; H02K 3/12; H02K 3/28
See application file for complete search history.

(56) References Cited

U.S. PATENT DOCUMENTS

| | | | | |
|---|---|---|---|---|
| 2,660,681 A | * | 11/1953 | Horne | H02K 24/00 310/146 |
| 7,362,031 B2 | * | 4/2008 | Maita | H02K 23/405 310/216.011 |

(Continued)

FOREIGN PATENT DOCUMENTS

| | | | | |
|---|---|---|---|---|
| CN | 102059954 A | | 5/2011 | |
| CN | 104285364 A | * | 1/2015 | ........... H02K 13/006 |

(Continued)

OTHER PUBLICATIONS

WO-2013168435-A1, Kimura, All pages (Year: 2013).*

(Continued)

*Primary Examiner* — Naishadh N Desai
(74) *Attorney, Agent, or Firm* — Michael Best & Friedrich LLP (57) ABSTRACT

A rotor assembly (100), comprising a rotor (101) and a rotor winding (102). The rotor (101) is provided with a plurality of teeth; tooth slots are provided between adjacent teeth; the rotor (101) can be connected to a rotor shaft to output power; the rotor winding (102) is composed of coils wound on the rotor (101); the rotor winding (102) comprises a portion extending in an axial direction parallel to the rotor assembly (100) and a portion extending in a plane perpendicular to the axial direction; the portion extending in the plane perpendicular to the axial direction comprises a plurality of sections; in the axial direction, the plurality of sections are in one-to-one correspondence to corresponding sides of two or more polygons, respectively. The winding method can solve the problems such as length difference of copper wires between windings due to sequential superposition of the coils in traditional windings, thus achieving the technical effects of improving the balance of the armature and minimizing the difference in resistance of windings.

5 Claims, 8 Drawing Sheets

(56) References Cited

U.S. PATENT DOCUMENTS

| | | | | |
|---|---|---|---|---|
| 2001/0038253 A1* | 11/2001 | Furuya | ................... | H02K 29/03 |
| | | | | 310/269 |
| 2011/0050025 A1* | 3/2011 | Doushita | ................ | H02K 23/36 |
| | | | | 310/239 |
| 2015/0061448 A1* | 3/2015 | Kimura | ................... | H02K 5/148 |
| | | | | 310/177 |

FOREIGN PATENT DOCUMENTS

| | | | | |
|---|---|---|---|---|
| CN | 110277857 A | 9/2019 | | |
| CN | 209913598 U | 1/2020 | | |
| JP | 2005117702 A | 4/2005 | | |
| WO | WO-2013168435 A1 * | 11/2013 | ........... | H02K 13/006 |

OTHER PUBLICATIONS

CN-104285364-A, Kimura, All pages (Year: 2015).*
English translation of the International Search Report with Written Opinion for related Application No. PCT/CN2020/100612 dated Oct. 15, 2020 (6 Pages).

* cited by examiner

ROTOR ASSEMBLY AND MOTOR HAVING SAME

TECHNICAL FIELD

The present invention relates to a motor, and more particularly to a rotor assembly and a motor comprising the rotor assembly.

BACKGROUND ART

The motor rotor assembly is generally composed of a rotor, a rotor shaft, a winding, etc. The rotor is generally formed by stacking steel sheets with teeth, wherein a rotor shaft is provided in the middle of the rotor, and the rotor winding is disposed on the teeth of the rotor. The winding consists of a certain number of coils connected according to a certain rule, and the winding method has a greater impact on the performance of the rotor and even the motor.

The following are two rotor winding methods commonly used at present.

Figure 1:
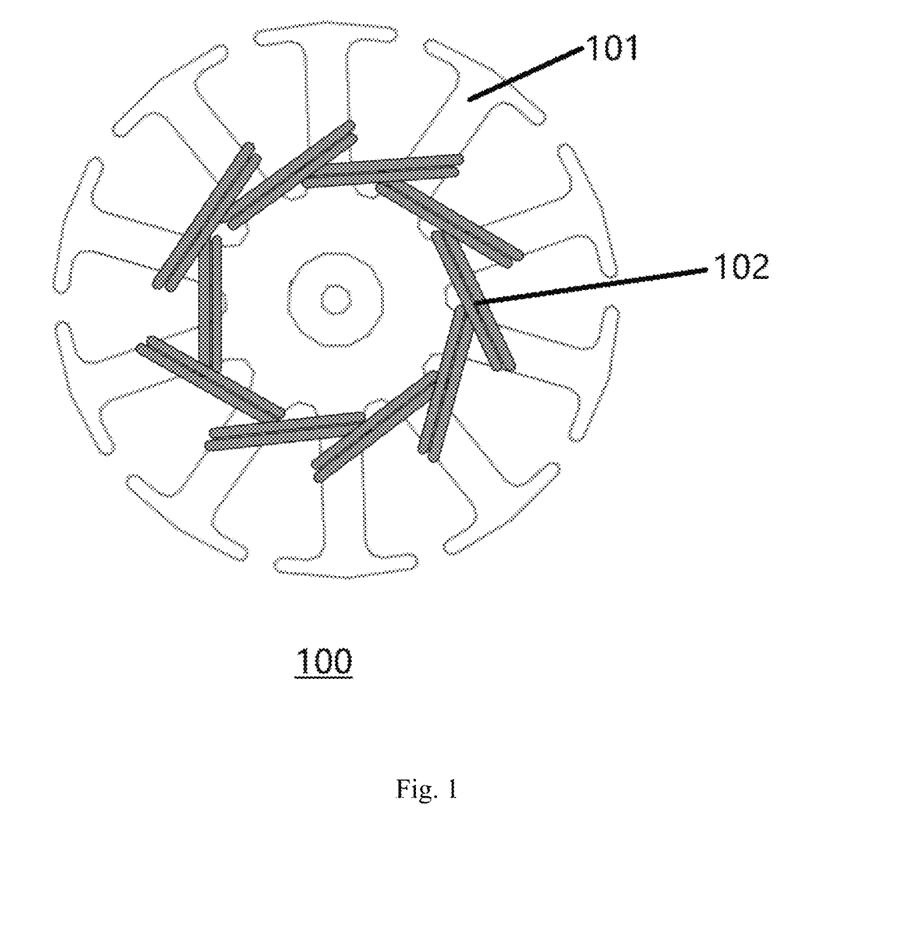
FIG. 1 is a top view of a rotor winding in the "sequential winding using single-flying-fork" method in the prior art.
Figure 2:
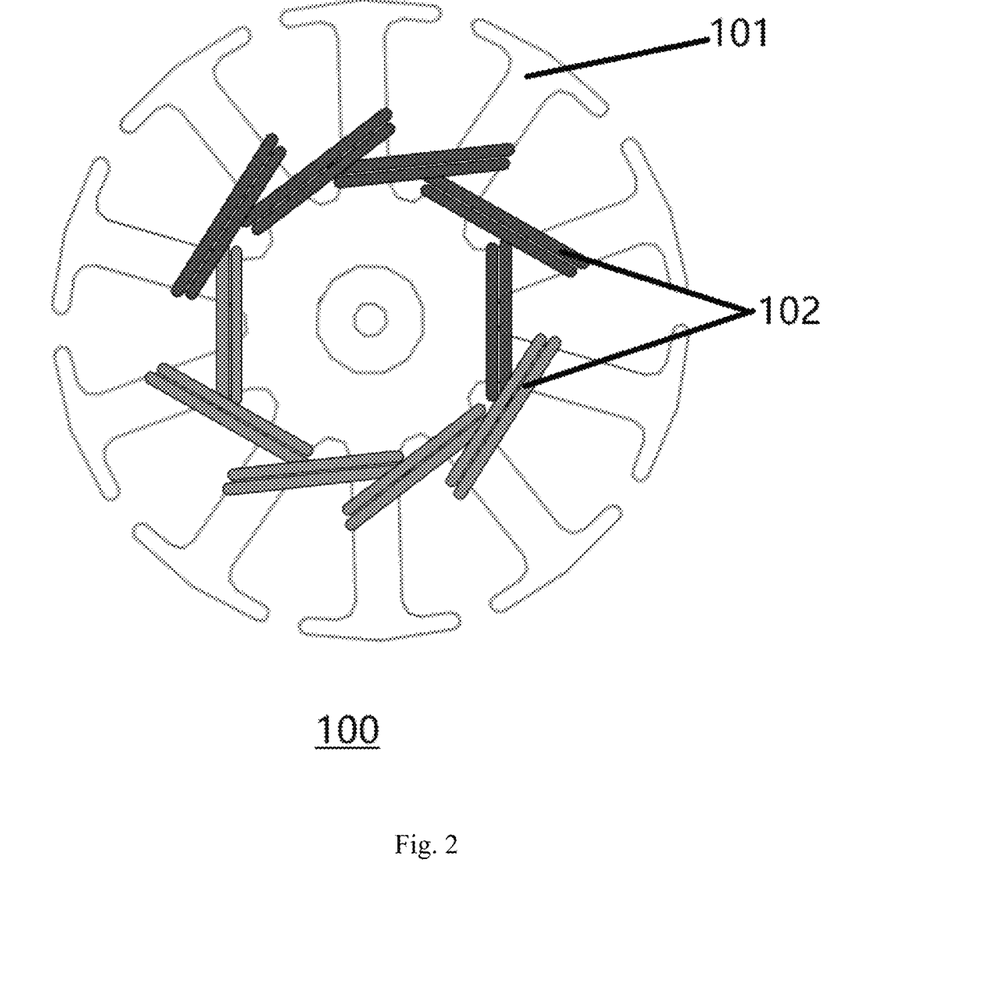
FIG. 2 is a top view of a rotor winding in the "symmetrical winding using twin-flying-fork" method in the prior art.

1. sequential winding using single-flying-fork: with the top view of the rotor assembly after winding shown in FIG. 1. In the rotor assembly 100, the rotor winding 102 is disposed on the rotor 101. In this method, winding is performed sequentially with a mold, an enameled wire, and a tension system;

2. symmetrical winding using twin-flying-fork: with the top view of the rotor assembly after winding shown in FIG. 2. In the rotor assembly 100, the rotor winding 102 is disposed on the rotor 101. Differently from FIG. 1, the rotor winding 102 is formed by symmetrical winding with two molds, two enameled wires, and two tension systems.

However, the two methods both have disadvantages:

For the sequential winding using single-flying-fork, the weight distribution of the armature after winding is not uniform, resulting in a large amount of dynamic unbalance; the armature windings have different sizes, resulting in inconsistency between adjacent resistances of the commutator; the stacking method of windings is not conducive to the utilization of the space in the slot;

For the symmetrical winding using twin-flying-fork, due to the differences in mold size, tension control, and enameled wire performance, the weight distribution of the rotor after winding is not uniform; since the winding copper wires are different in length, the windings have different resistances; the stacking method of the windings is not conducive to the utilization of the space in the slot; the rotor winding efficiency is very low.

SUMMARY OF THE INVENTION

To solve the above technical problems to a certain extent, the present invention proposes the following technical solution:

A rotor assembly, comprising a rotor and a rotor winding, wherein the rotor is provided with a plurality of teeth and tooth slots are provided between adjacent teeth; the rotor can be connected to a rotor shaft to output power; the rotor winding is composed of coils wound on the rotor; the rotor winding comprises a portion extending in an axial direction parallel to the rotor assembly and a portion extending in a plane perpendicular to the axial direction, the portion extending in the plane perpendicular to the axial direction comprising a plurality of sections, characterized in that in the axial direction, the plurality of sections are in one-to-one correspondence to corresponding sides of two or more polygons, respectively.

According to one aspect of the present invention, the polygon is a regular polygon, and there is no overlap between the sections in one-to-one correspondence to the sides of the same regular polygon.

According to one aspect of the present invention, when the number of tooth slots of the rotor is 10, the plurality of sections are in one-to-one correspondence to the sides of two regular pentagons.

According to one aspect of the present invention, when the number of tooth slots of the rotor is 12, the plurality of sections are in one-to-one correspondence to the sides of four regular triangles.

According to one aspect of the present invention, the sections in one-to-one correspondence to the sides of the same polygon are located in the same plane perpendicular to the axial direction.

According to one aspect of the present invention, from an axial direction, there is an overlap between the sections in one-to-one correspondence to the sides of the same polygon.

According to one aspect of the present invention, when the number of tooth slots of the rotor is 14, the plurality of sections are in one-to-one correspondence to the sides of two heptagons.

Furthermore, the present invention also relates to a motor comprising a rotor assembly according to the present invention.

The rotor winding obtained from the above technical solution has uniform winding mass distribution, which can significantly reduce the dynamic unbalance of the armature; the adjacent and diagonal resistances of the commutator on the armature are the same, which can improve the maximum slot full rate of the rotor winding. In addition, it is available to complete rotor winding with one winding flying fork, one enameled wire, and one tension system. Therefore, the manufacturing cost of the motor is reduced, the manufacturing efficiency is improved, and the performance of the motor, such as vibration and noise, is optimized to some extent.

BRIEF DESCRIPTION OF THE DRAWINGS

Exemplary embodiments of the present invention are described with reference to the accompanying drawings, wherein:

FIG. 3b is an expanded view of the rotor winding in FIG. 3a.

FIG. 4b is an expanded view of the rotor winding in FIG. 4a.

FIG. 5b is an expanded view of the rotor winding in FIG. 5a.

All the drawings are only schematic and are not necessarily drawn to scale. Furthermore, they only show the parts which are necessary to elucidate the present invention, and other parts are omitted or only mentioned. That is, the present invention may include other components in addition to the components shown in the drawings.

DETAILED DESCRIPTION OF THE EMBODIMENTS

The technical solution of the present invention will be described in detail below with reference to the accompanying drawings.

Figure 3A:
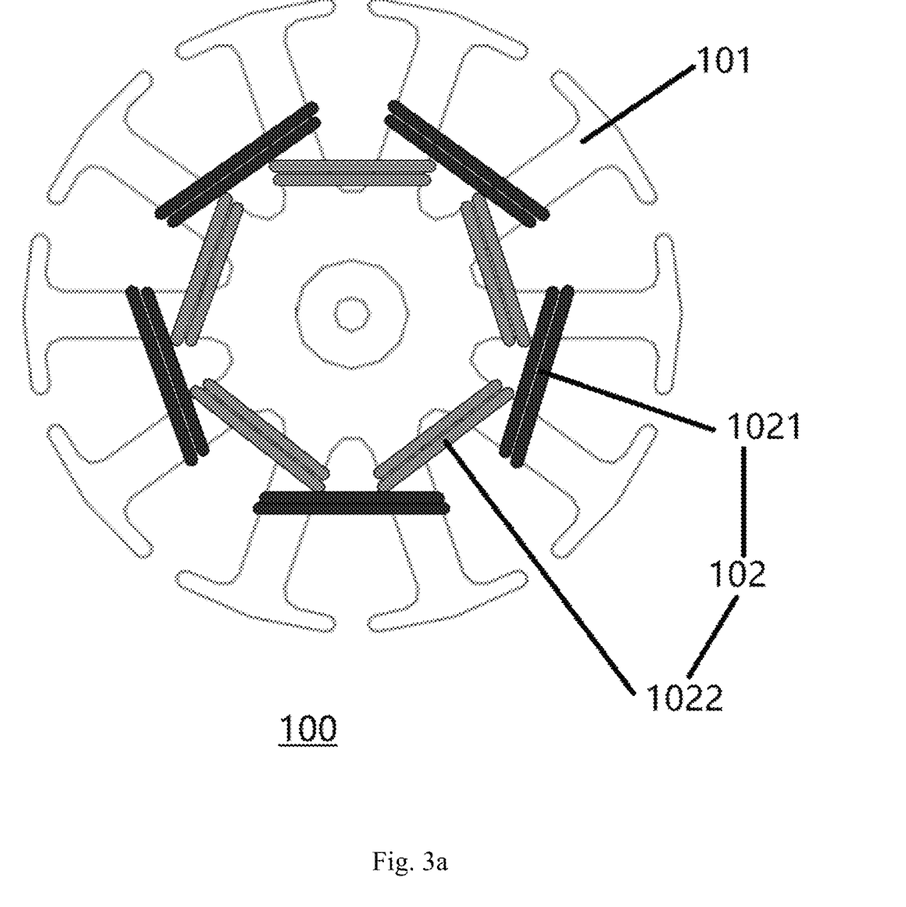
FIG. 3a is a top view of a rotor winding with 10 rotor slots according to the present invention.
Figure 4A:
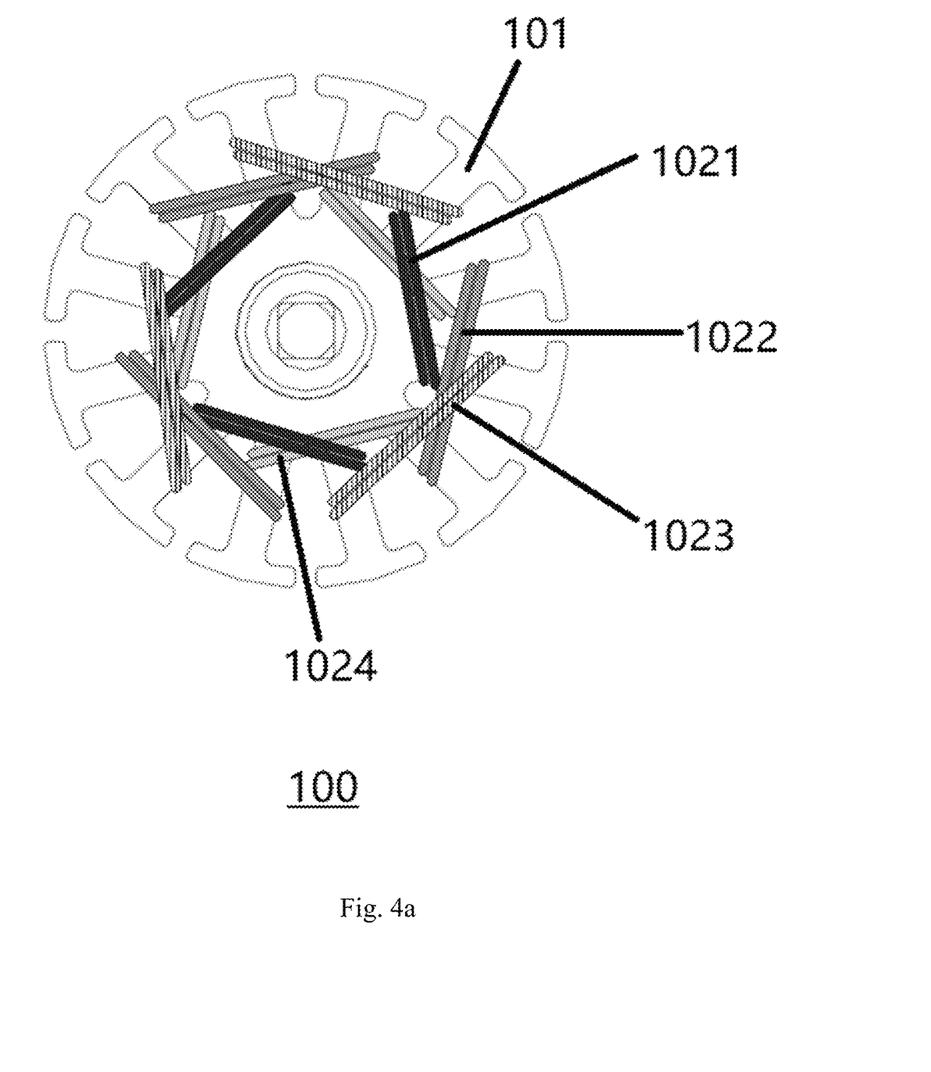
FIG. 4a is a top view of a rotor winding with 12 rotor slots according to the present invention.
Figure 5A:
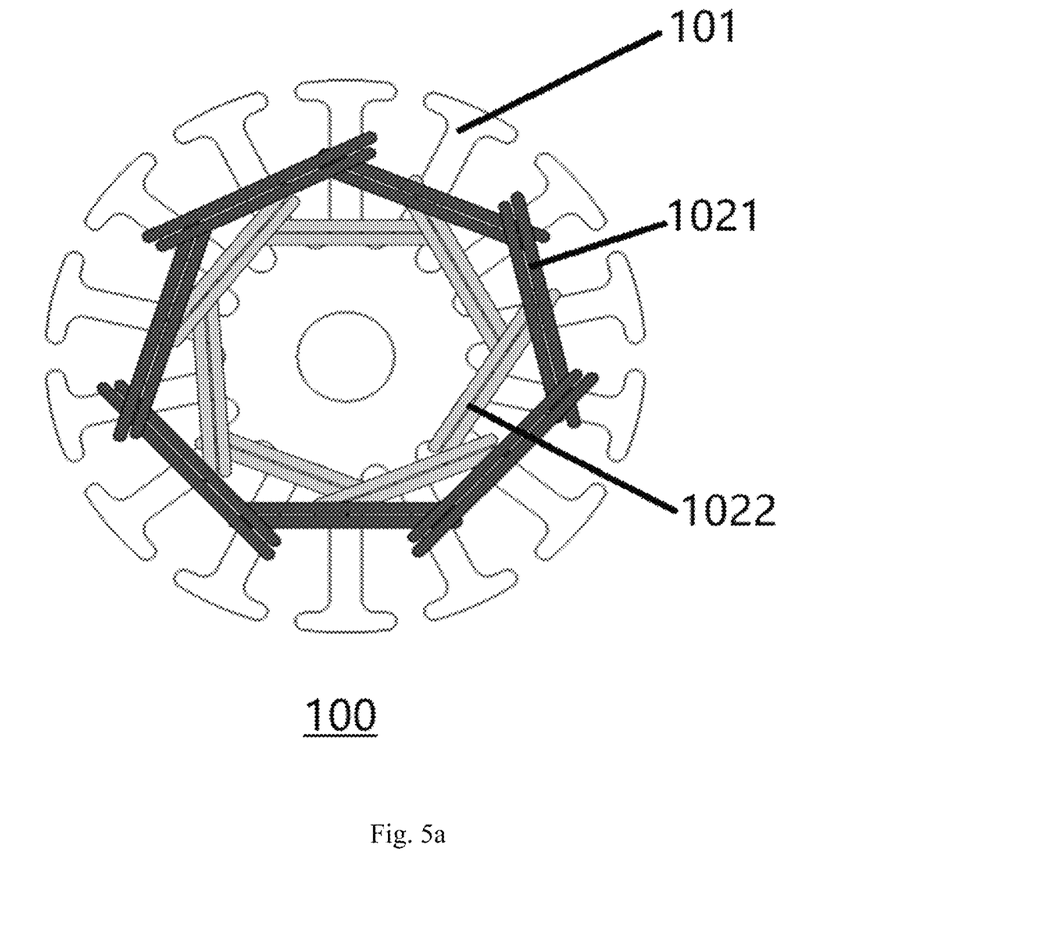
FIG. 5a is a top view of a rotor winding with 14 rotor slots according to the present invention.

Referring to FIGS. 3a, 4a and 5a, the rotor assembly 100 in the present invention mainly includes a rotor 101 and a rotor winding 102. The rotor 101 is generally formed by stacking a plurality of silicon steel sheets with the same shape and thickness. The rotor 101 has a plurality of teeth, and tooth slots are formed between adjacent teeth. The central part of the rotor 101 is provided with a shaft hole, so that the rotor can be connected with the shaft to output power.

The rotor winding 102 is composed of coils wound on the rotor 101, and the coils are, for example, enameled wires. The rotor winding 102 is mainly wound in the tooth slots of the rotor 101. According to the actual winding situation, when the winding winds out of one tooth slot, it can enter another tooth slot across one or more tooth slots. When the winding is passed through the tooth slot, the winding direction is substantially parallel to the axial direction of the rotor 101. Therefore, according to the extending direction of the winding, the rotor winding 102 can be divided into a portion extending in a direction parallel to the axial direction of the rotor assembly 100 and a portion extending in a plane perpendicular to the axial direction, and viewed in the axial direction, the portion of the rotor winding 102 extending in a plane perpendicular to the axial direction includes a plurality of sections.

In order to solve the problems existing in the single-flying-fork winding or the twin-flying-fork winding in the prior art, the present invention proposes the following improvement: the rotor winding 102 is wound such that when viewed from the axial direction, the multiple sections of the rotor winding 102 or the extension lines thereof form two or more polygons. In other words, the multiple sections of the rotor winding 102 fall on the sides of two or more polygons, respectively, and correspond one-to-one with the sides of the polygons.

The rotor assembly obtained from this winding method has uniform winding mass distribution, which can significantly reduce the dynamic unbalance of the armature; the adjacent and diagonal resistances of the commutator on the armature are the same, which can improve the maximum slot full rate of the rotor winding. In addition, it is available to complete rotor winding with one winding flying fork, one enameled wire, and one tension system.

Specifically, as an embodiment of the present invention, referring to FIG. 3a, the rotor 101 has 10 teeth and 10 tooth slots, and the multiple sections of the rotor winding 102 are in one-to-one correspondence to the sides of two regular pentagons; wherein the extension lines of the five rotor sections 1021 form a regular pentagon on the outside, the extension lines of the five rotor sections 1022 form a regular pentagon on the inside, wherein there is no overlap between the five rotor sections 1021, and there is no overlap between the five rotor sections 1022 either. Therefore, the five rotor sections 1021 on the sides of the outer regular pentagon are axially located in the same plane (hereinafter also referred to as "layer"), and the five rotor sections 1022 on the sides of the inner regular pentagon also lie in the same plane in the axial direction.

Since multiple sections form a regular pentagon and are located in the same plane perpendicular to the axial direction, and the sections corresponding to the same regular pentagon are not overlapped, the windings for the sections have the same length. As a result, the overall structure of the rotor winding is uniform, the mass distribution is uniform, the dynamic unbalance relative to the rotor shaft is small, and the kinematic performance of the rotor and the performance of the motor are improved. The distribution of the multi-strand windings in the radial direction increases the slot fullness of the rotor winding.

Figure 3B:
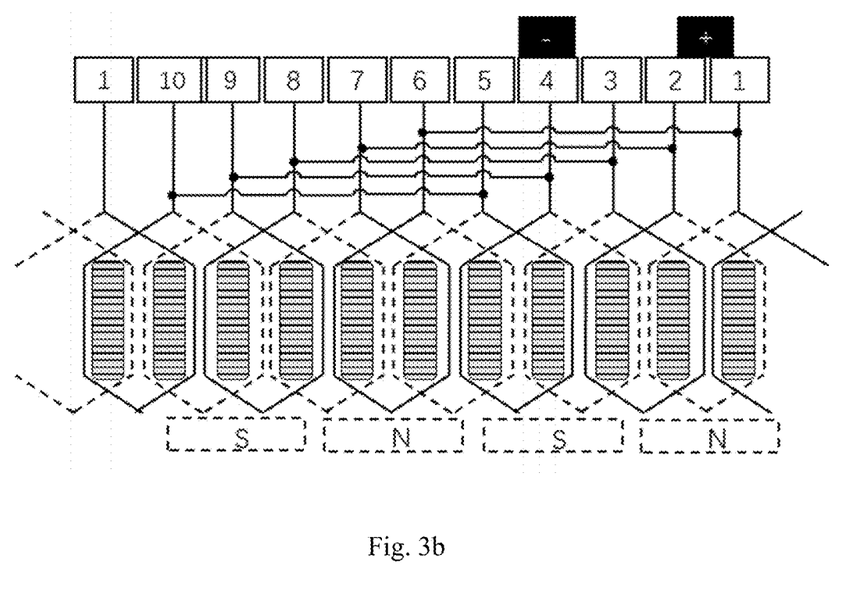

In order to obtain the rotor assembly 100 shown in FIG. 3a, an exemplary winding method is provided here. Referring to the expanded view of the winding shown in FIG. 3b, first, the winding is hooked to hook 1 and forms a first turn of the coil by crossing two teeth; then it is hooked to the adjacent hook 2 as well as hook 7, the diagonal of hook 2 (or hook 7, the diagonal of hook 2, and hook 2 that is adjacent to hook 1), then forms a second turn of the coil by crossing two teeth; then it is hooked to hook 3 adjacent to hook 2 and hook 8, the diagonal of hook 3 (or hook 8, the diagonal of hook 3 and hook 3 adjacent to hook 2), then forms a third turn of the coil by crossing two teeth, so on and so forth, until it returns to hook 1 to finish winding. Finally two layers of windings are formed, with five sections on each layer, wherein there is no overlap between the five sections of each layer.

As another embodiment of the present invention, referring to FIG. 4a, the rotor 101 has 12 teeth and 12 tooth slots, and the multiple sections of the rotor winding 102 are in one-to-one correspondence to the sides of four regular triangles; wherein the extension lines of the three rotor sections 1021 form a regular triangle, the extension lines of the three rotor sections 1022 form a regular triangle, the extension lines of the three rotor sections 1023 form a regular triangle, and the extension lines of the three rotor sections 1024 form a regular triangle, and there is no overlap between the rotor sections that correspond one-to-one with the sides of each regular triangle. Likewise, the rotor sections corresponding to the sides of the same regular triangle lie in the same plane perpendicular to the axial direction.

Figure 4B:
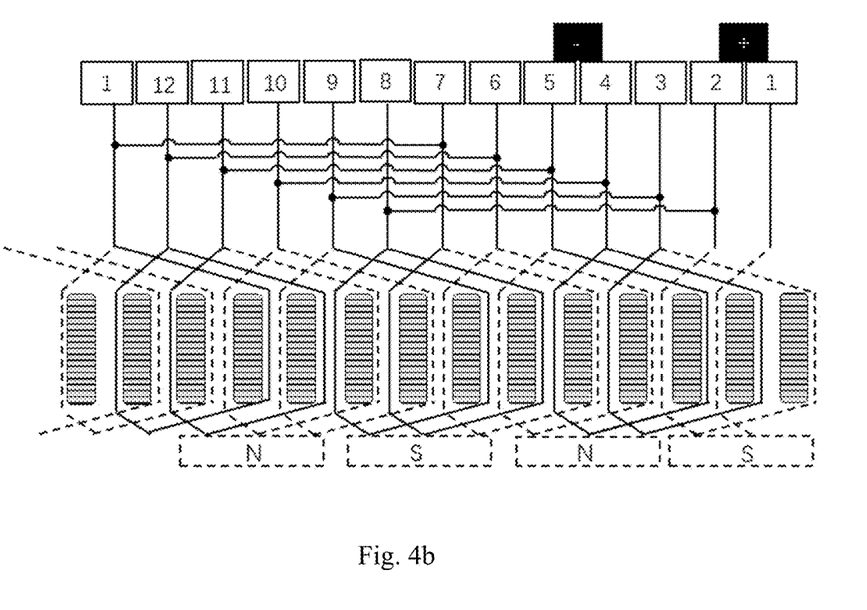

In order to obtain the rotor assembly 100 shown in FIG. 4a, an exemplary winding method is presented here. Referring to the expanded view of the winding shown in FIG. 4b, first, the winding is hooked to hook 1 and forms a first turn of the coil by crossing three teeth; then it is hooked to the adjacent hook 2 as well as hook 8, the diagonal of hook 2 (or hook 8, the diagonal of hook 2, and hook 2 that is adjacent to hook 1), then forms a second turn of the coil by crossing three teeth; then it is hooked to hook 3 adjacent to hook 2 and hook 9, the diagonal of hook 3 (or hook 9, the diagonal of hook 3 and hook 3 adjacent to hook 2), then forms a third turn of the coil by crossing three teeth, so on and so forth, until it returns to hook 1 to finish winding. Finally four layers of windings are formed, without an overlap between the sections of each layer.

In the rotor assembly of this winding form, the windings are divided into different layers, and there is no overlap between the sections in each layer that correspond one-to-one with the sides of the same regular polygon. Therefore, compared with the multi-layer stacked winding in the prior art, the stacking number is reduced and the difference in winding length caused by stacking is avoided, which significantly solves the problem of uneven mass distribution and inconsistent resistances.

As still another embodiment of the present invention, referring to FIG. 5a, the rotor 101 has 14 teeth and 14 tooth slots, and the multiple sections of the rotor winding 102 are in one-to-one correspondence to the sides of two heptagons; wherein the seven rotor sections 1021 are located on the sides of the outer heptagon, and the seven rotor sections 1022 are located on the sides of the inner heptagon, and the rotor sections corresponding to each heptagon are overlapped with each other. Due to the stacking, the rotor sections corresponding to the sides of each heptagon lie in different planes in the axial direction.

Figure 5B:
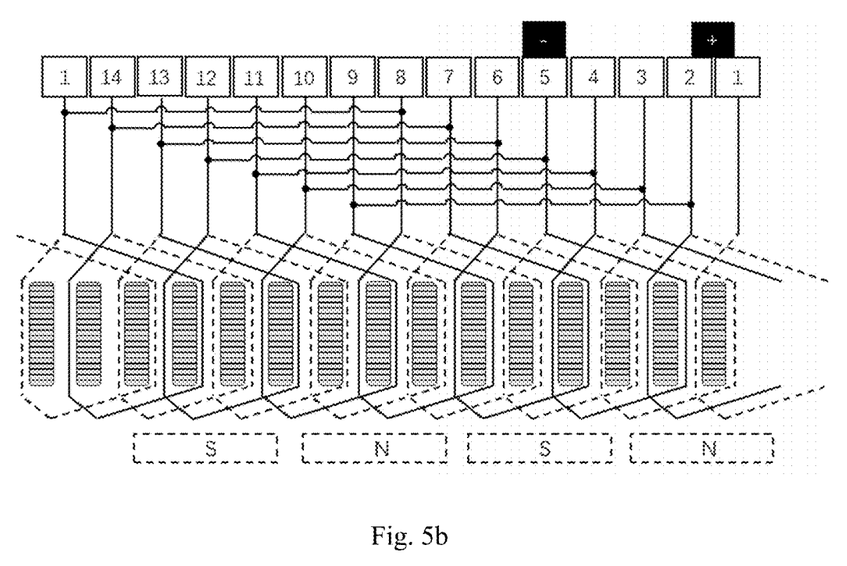

In order to obtain the rotor assembly 100 shown in FIG. 5a, an exemplary winding method is presented here. Referring to the expanded view of the winding shown in FIG. 5b, first, the winding is hooked to hook 1 and forms a first turn of the coil by crossing three teeth; then it is hooked to the adjacent hook 2 as well as hook 9, the diagonal of hook 2 (or hook 9, the diagonal of hook 2, and hook 2 that is adjacent to hook 1), then forms a second turn of the coil by crossing three teeth; then it is hooked to hook 3 adjacent to hook 2 and hook 10, the diagonal of hook 3 (or hook 10, the diagonal of hook 3 and hook 3 adjacent to hook 2), then forms a third turn of the coil by crossing three teeth, so on and so forth, until it returns to hook 1 to finish winding. Finally two layers of windings are formed, with seven sections on each layer, wherein the seven sections on each layer sequentially share a rotor tooth.

In the rotor assembly of this winding form illustrated in this embodiment, the windings are divided into two layers. Although there are overlaps between the sections in each layer that correspond one-to-one with the sides of the same regular polygon, compared with the multi-layer stacked winding in the prior art, the stacking number is reduced and the difference in winding length caused by stacking is reduced, which significantly solves the problem of uneven mass distribution and inconsistent resistances. In addition, the symmetry of the regular polygon makes the mass distribution of the rotor assembly more balanced. The multi-layer distribution in the radial direction increases the slot fullness of the rotor winding.

The above-mentioned winding methods of the present invention can solve the problems such as length difference of copper wires between windings due to sequential superposition of the coils in traditional windings, thus achieving the technical effects of improving the balance of the armature and minimizing the difference in resistance of windings.

The above exemplary embodiments have made a clear and complete description of the present invention, and those skilled in the art should understand that, various other embodiments may be envisaged by modifying the disclosed technical solutions without departing from the spirit and scope of the present invention. These embodiments should be construed as falling within the scope of the present invention as determined by the claims and any equivalent technical solution thereof.

The invention claimed is:

1. A rotor assembly comprising:
  a rotor provided with 14 teeth and connected to a rotor shaft, wherein tooth slots are provided between adjacent teeth;
  a rotor winding having coils wound on the rotor and including a portion extending in a plane perpendicular to the axial direction, the portion extending in the plane perpendicular to the axial direction comprising a plurality of sections, wherein when viewed in the axial direction, the plurality of sections correspond to sides of two heptagons.

2. The rotor assembly according to claim 1, wherein when viewed in an axial direction, there is overlap between the sections corresponding to the sides of the same heptagon of the two heptagons.

3. A motor comprising a rotor assembly according to claim 1.

4. A rotor assembly comprising:
  a rotor provided with a plurality of teeth and connected to a rotor shaft, wherein tooth slots are provided between adjacent teeth;
  a rotor winding having coils wound on the rotor and including a portion extending in a plane perpendicular to the axial direction, the portion extending in the plane perpendicular to the axial direction comprising a plurality of sections, wherein when viewed in the axial direction, the plurality of sections correspond to sides of two or more polygons and there is overlap between the sections corresponding to the sides of the same polygon of the two or more polygons.

5. A motor comprising a rotor assembly according to claim 4.

* * * * *